United States Patent [19]

Hagedorn

[11] Patent Number: 4,843,620

[45] Date of Patent: Jun. 27, 1989

[54] HAND-HELD TELEPHONE LINE SIGNALING TEST INSTRUMENT

[75] Inventor: Guenter E. Hagedorn, Minnetonka, Minn.

[73] Assignee: Nicollet Technologies, Inc., Eden Prairie, Minn.

[21] Appl. No.: 212,958

[22] Filed: Jun. 29, 1988

[51] Int. Cl.[4] .................. H04M 1/24; H04M 3/32
[52] U.S. Cl. ........................ 379/21; 379/26; 379/29
[58] Field of Search .............. 379/21, 27, 29, 22, 379/26, 233, 234

[56] References Cited
U.S. PATENT DOCUMENTS 4,194,098  3/1980  Carlson ........................ 379/21

Primary Examiner—Stafford D. Schreyer
Attorney, Agent, or Firm—Merchant, Gould, Smith, Edell and Welter

[57] ABSTRACT

A hand-held telephone line signaling test instrument is described which provides test and timing measurment for telephone lines employing DID, DOD and POTS trunk lines. The hand-held instrument is capable of sourcing wink-start reverse battery protocol and DTMF, dial pulse or MF dial codes for testing a DID trunk. The device also incorporates a termination impedance and dial code receivers for DTMF, dial pulse and MF dialing codes. Analysis and comparison of the timing and measurements is performed by an internal microprocessor-based system with the results of the measurements displayed on an LCD alphanumeric display.

10 Claims, 9 Drawing Sheets

HAND-HELD TELEPHONE LINE SIGNALING TEST INSTRUMENT

FIELD OF THE INVENTION

The present invention relates to the field of telephone technology and in particular to timing and error detection test measurement devices for telephone systems employing DID (direct inward dialing), DOD (direct outward dialing), and POTS (Plain Old Telephone Service) trunk lines.

DESCRIPTION OF THE PRIOR ART

Typical Central Office and PBX (Private Branch Exchange) systems employ sophisticated switching mechanisms to distribute telephone calls within a private business or public network, and hence the transfer of telephone calls to, from and between the central offices and PBX systems requires accurate and fast signaling and communication to ensure proper handling of the telephone calls. The mishandling of telephone calls between central offices and between the PBX system and the central office can of course be caused by a variety of problems traceable to either a failure of the PBX system, the transmission lines, or the central office equipment. The owner of a PBX system and the field service technician from the telephone company must be able to isolate the failures to either customer-owned equipment, customer-leased equipment, or central office equipment so that unnecessary time and expense is not wasted in finding the failure and correcting it.

Prior art test systems for measuring the signaling and handshaking communications between central offices and between the PBX system and a central office over telephone lines are often large, difficult to carry to the field for on-site testing, and often singular in their purpose. A field test technician often must carry several devices to provide the test and measurement functions needed to isolate a problem in a PBX system. There is a need in the prior art, therefore, for a specialized hand-held test and measurement device for troubleshooting DID, DOD and POTS telephone lines connected between central offices or between a central office and a PBX system.

SUMMARY OF THE INVENTION

The present invention solves the aforementioned problems and other problems that will be recognized by those skilled in the art upon reading and understanding the present specification. The present invention is directed toward test and measurement of signals communicated between a PBX system and a central office or between central offices over DID, DOD or POTS telephone lines. The present invention may be practiced at several different levels of functionality, depending upon the complexity of the problem addressed, and hence two preferred embodiments are disclosed.

The first embodiment of the present invention is a hand-held microprocessor-controlled signaling test instrument for DID wink-start or immediate-start telephone lines which includes a connection means for connecting to the tip and ring conductors of a telephone line from the central office, to which a talk battery source is connected through a polarity reversal relay which can be operated to generate a wink start for DID applications. A dialing code receiver is attached to the connection means for providing DTMF dialing information to the control means which in turn provides test and measurement functions on the telephone lines. The control means is connected for testing the response from the central office to tone frequencies and durations for DTMF dialing codes, timing and response to wink-start and testing the timing and response to placing an impedance across the line in a DOD application. This telephone line signaling test instrument is sized as a hand-held portable device.

A second preferred embodiment of the present invention is a hand-held microprocessor-controlled telephone line signaling test instrument which is adaptable to testing DID, DOD and POTS telephone lines. This second embodiment includes further test and measurement capabilities to determine timing and signaling errors using DTMF, dial pulse, MF (multi-frequency) and CALL PROGRESS handshaking tones. The response of the central office or PBX is tested using any one of the aforementioned four dialing or signaling formats, and the results of the response is provided on a display housed within a hand-held portable case.

The second preferred embodiment of the present invention includes a telephone line connection means to which a battery feed circuit is connected for sourcing talk batteries through a polarity reversal relay circuit for sourcing talk battery voltage and wink-start in the case of DID telephone trunk lines. Also connected to the telephone connection means is a line interface circuit which includes a termination impedance which is used to initiate telephone calls for DOD and POTS telephone trunk lines. A dial pulse and line seizure detection circuit is connected to the line interface circuit for receiving pulse dial information and for detecting reverse battery wink on the telephone line. A DTMF and MF receiver circuit is connected to the line interface circuit for receiving dialing codes in either MF or DTMF dialing codes. A DTMF and MF transmitter circuit is also connected to the line interface circuit for transmitting dialing code in either format. A CALL PROGRESS tone generator circuit is also connected to the line interface circuit for generating and transmitting CALL PROGRESS tones. The dial pulse and line seizure detection circuit, the DTMF and MF receiver circuit, the DTMF and MF transmitter circuit, and the CALL PROGRESS tone generator circuit ar all connected via data bus lines to a control means which operates to generate tests for DID, DOD or POTS telephone trunk lines and to analyze the results of those tests. The user may select tests to be performed, and the results of those tests are indicated on an indicator means. This entire telephone line signaling test instrument is sized as a hand-held portable device.

BRIEF DESCRIPTION OF THE DRAWINGS

In the drawings, where like numerals refer to like components throughout the several views.

DETAILED DESCRIPTION OF THE PREFERRED EMBODIMENT

Figure 1:
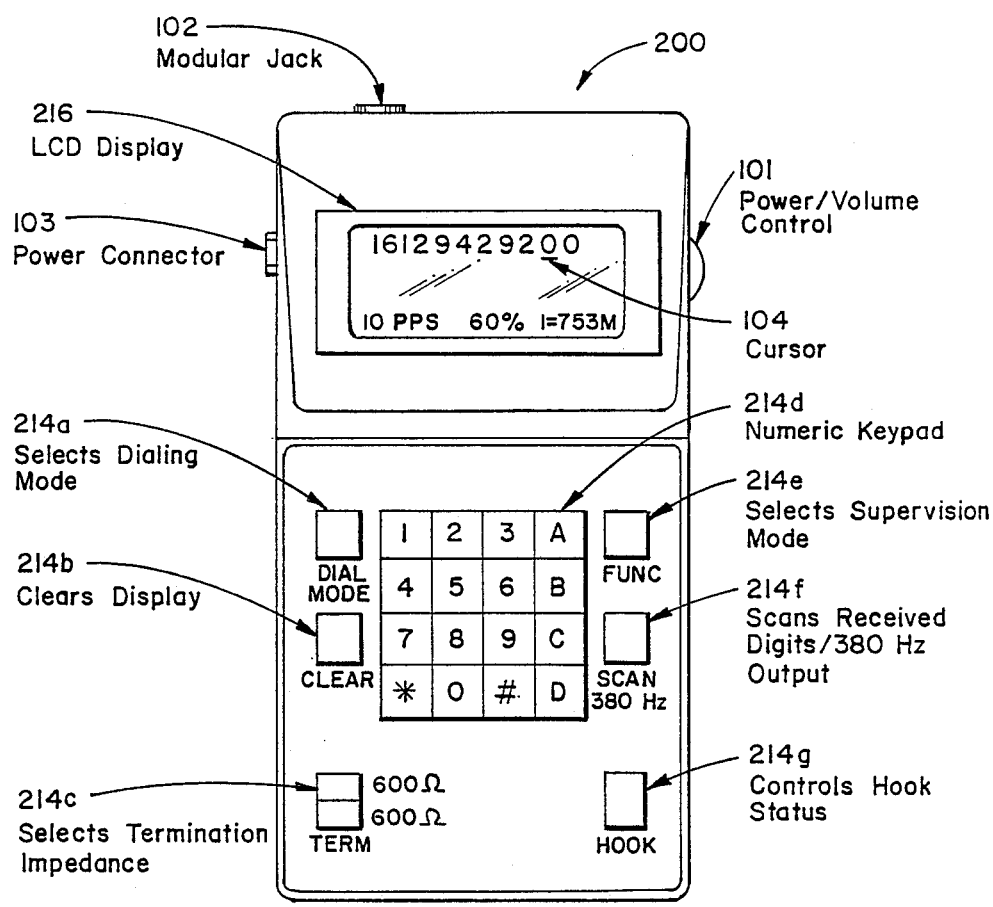
FIG. 1 is the front panel view of a hand-held telephone line signaling test instrument.

In the following detailed description of the preferred embodiments, reference is made to the accompanying drawings which form a part hereof, and in which is shown by way of illustration specific embodiments in which the present invention may be practiced. These preferred embodiments are described in sufficient detail to enable those skilled in the art to practice the invention, and it is to be understood that other embodiments may be utilized and that structural or electrical changes may be made without departing from the spirit and scope of the present invention. The following detailed description is, therefore, not to be taken in a limiting sense, and the scope of the present invention is defined by the appended claims.

The preferred embodiments of the present invention are telephone signaling test and measurement apparatus for connection to the DID, DOD or POTS trunk lines connected between central offices or between a central office and a PBX system. The present invention can test and measure the supervisory signals and the telephone number transmissions between the PBX and the central office. For the purpose of a better understanding of the present invention, a brief description of some of the handshake protocol typically used on DID, DOD and POTS lines is included here.

PBX systems using DID (Direct Inward Dialing) and DOD (Direct Outward Dialing) trunk lines allow disproportionate ratios of the incoming and outgoing lines so that, for example, a business may handle a large number of incoming calls while only needing a small number of output lines to handle outgoing calls. Thus, for example, the business may have one hundred DID lines and only ten DOD lines. The DID lines are unassigned until an incoming call to the PBX is routed by the central office. One of the plurality of DID lines is selected by the central office, and the call is routed to the PBX for final connection. The same system is used on DOD lines under control of the PBX. The trunk signaling between the central office and the PBX on the DID and DOD lines most often used is loop reverse battery, more commonly called wink start protocol. A less common form of signaling is immediate start, in which the extension of digits is downloaded at a specific time after the central office seizes the trunk, in the case of a DID line, or in which the telephone number of the called party is downloaded to the central office at a specific time after the PBX seizes the trunk, in the case of a DOD line.

The DID protocol begins with the central office seizing one of the DID trunk lines by placing a DC load impedance across the trunk line. Since the PBX sources the talk battery voltage on a DID trunk (the central office sources talk battery on a DOD trunk), a current loop is created between the tip and ring wires of the trunk line. The current flowing through this loop is immediately sensed by the PBX and after an approximately 100-millisecond wait period the PBX sends an approximately 200-millisecond wink in the form of reversing the battery voltage between the tip and ring wires of the trunk line. This signals the central office that the PBX is ready to receive the address or in-house extension for the incoming call. After sensing the reverse battery wink, the central office waits for an additional approximately 30 milliseconds after the wink is completed, after which the central office sends the digits for the address or in-house extension. Upon receipt of the digits, the PBX connects the trunk line to the appropriate telephone set to complete the call.

In a DOD line application, the roles of the central office and the PBX are reversed in terms of supervisory signaling. In older PBX systems employing POTS trunk lines, the central office always sources the talk battery, and the PBX merely places a DC load impedance across the line to initiate a telephone call, whether the call is incoming or outgoing. In more sophisticated PBX applications, the PBX may also source or receive CALL PROGRESS tones such as dial tone, reorder, busy, audible ring back, etc. In addition, PBX systems may employ dial pulse signaling for transmission of dial codes, or in the alternative it may use DTMF tones or MF tones.

FIG. 1 is a front view of the hand-held telephone line signaling test instrument 200 of the present invention. The instrument is sized to fit comfortably in the palm of one's hand. An external power source is connected through power connector 103, such as a −54VDC. This voltage can be derived from a line voltage transformer (not shown). The telephone line connection of the device can be made through modular jack 102. Those skilled in the art will readily recognize that alternate connection arrangements could be provided to the telephone line, such as a bantam jack. The status and results of the signaling test and measurements performed on the telephone line are shown in the 4-line, 64-character alphanumeric LCD display 216. A small speaker is incorporated within device 200 with a speaker grill placed on the sides or bottom of the unit (not shown). A combination power and volume control knob 101 both powers on the unit and adjusts the volume control of the speaker monitor.

A plurality of buttons is provided on the front face of the monitor 200 for selecting functions and test modes. For example, switch 214g controls the hook status of the device. Depressing button 214g once places the test instrument 200 off-hook, while a second depression places the instrument 200 on-hook. The hook status is displayed by display 216. Switch 214a selects the dialing mode of the test instrument. Upon initial power-up of the instrument, the default dialing mode is DTMF. By pressing button 214a once selects pulse dial mode, which is then displayed on one line of the LCD display 216. Depressing button 214a a second time will select MF dialing mode for which the unit would be ready to send MF digits 0 through 9 and/or codes KP through ST3P. The MF status would also be displayed on LCD display 216. Depressing button 214Aa a third time will place test instrument 200 in CALL PROGRESS mode for transmitting CALL PROGRESS frequency tones. Depressing button 214A once more places the unit in its default dial mode in which the monitor device 200 transmits or receives DTMF codes.

Button 214e selects the supervision mode of test instrument 200. When initially powered up, test instrument 200 is set up for operation in a normal loop environment. Depressing button 214e once places the device in wink-start DID environment, and one line of the display 216 will read "DIS-WS". Depressing button 214e a second time places the unit in immediate-start DID mode, and the display 216 will read "DID-IM". Depressing button 214e a third time sets the mode of operation for wink-start DOD mode, and LCD display 216 will read "DOD-WS". Depressing button 214e a fourth time will place test instrument 200 in the immediate-start DOD mode, and the display 216 will read "DOD-IM". Pressing button 214e once more places the unit in its default mode for normal loop environment.

The CLEAR button 214b clears the alphanumeric display 216 prior to receiving or transmitting a dialing sequence.

SCAN button 214f moves the cursor 104 on the display 216 from left to right to analyze the individual digits transmitted or received. By holding down the SCAN button for two seconds or more, the 380-Hz tone can be activated which is used for invoking selected functions in pay telephones. As the cursor 104 selects the digits on alphanumeric LCD display 216, the results of the analysis are shown below the number, as depicted in FIG. 1. For example, in pulse dial mode, the test instrument 200 measured ten pulses per second as the pulse rate for received digits with a 60% break time. The inter-digit period measured between each dialed digit was measured to be 753 milliseconds.

Termination impedance selection switch 214c selects between 600 or 900-ohm termination impedance depending upon the required termination impedance of the line being tested.

The numeric keypad 214d allows the user to input dialing sequences and CALL PROGRESS tone sequences. The digits 1–0 are applicable in the dial pulse mode, the digits 1–* in CALL PROGRESS, while the complete matrix of 4×4 is available for DTMF. In MF dialing, the numbers 1–0 apply, as well as "*" providing KP, "#" providing ST, "A" providing STP, "B" providing ST2P, and "C" providing ST3P.

For CALL PROGRESS tones, depressing 1 will produce dial tone, 2 produces reorder, 3 produces busy, 4 produces audible ring-back, 5 produces recall dial, 6 produces a special audible ring, 7 produces the intercept tones, 8 produces call waiting, 9 produces busy verification, 0 produces executive override, and * produces confirmation tones.

To operate the telephone line signaling test instrument 200, the device is switched ON by power/volume control 101. When power is initially applied, an initialization process is performed by the internal microcontroller and the default status of the device is first selected. The display 216 will show DTMF ON NORMAL as the status indicating DTMF mode dialing, onhook, and normal loop operation (for POTS lines). To begin signaling in a dial pulse mode, depressing button 214A once places the unit in dial mode. The user then simply enters the desired digit sequence into the keypad 214d. The number is stored in memory for later transmission in the selected dialing mode and is displayed on LCD display 216. Depressing switch 214g once places the test instrument 200 in off-hook mode, the word "OFF" will appear on display 216, and the stored digit sequence will be transmitted at standard dialing speed.

To monitor incoming DID lines, the user first powers the test instrument ON by power/volume control switch 101 and selects the desired line impedance for 600 or 900 ohms through switch 214c. The user then presses function button 214e to select either DID wink-start mode or DID immediate-start mode. DID-WS or DID-IM will appear on display 216 depending upon the mode selected. The test instrument will then monitor the telephone line until a seizure of the line is sensed. When seizure has been made by the central office, the monitor 200 will send the reverse battery wink at the standard time (if DID-WS mode was selected) and it will register the digits originating from the central office. Automatic timing of the digits transmitted from the central office is performed by test instrument 200 for later display by LCD display 216 when selected by cursor 104 through SCAN button 214f.

For DOD monitoring operations, the user powers ON the test instrument 200 through power/volume control switch 101. The user selects the desired line impedance and selects the desired dialing mode with dial mode switch 214A. DOD mode of operation is selected through function button 214A, which can be selected to be either wink-start or immediate-start. The selected supervision mode (DOD-WS or DOD-IM) will appear on the display 216. The user enters the digit sequence through keypad 214D and the dialed digit sequence will appear on LCD display 216. Up to 32 digits can be displayed with the first 16 digits displayed in the first row and the second 16 digits in the second row. Once the digits have been stored, the user depresses the hook switch button 214G to go off-hook. The central office will sense the off-hook state and will command the test instrument through a reverse battery wink to send the entered digit sequence or will simply monitor the line in the case of an immediate start DID line.

To analyze the wink parameters, the SCAN button 214F is depressed after sending or receiving a wink. The test instrument 200 will display wink duration, prewink duration or post-wink duration on one or more lines of display 216. To analyze the digits, the user presses the SCAN button 214f to move the cursor from right to left (with wrap-around). Timing analysis parameters such as tone duration and inter-digit duration are measured and displayed for DTMF and MF tones. Average pulses per second (PPS), percent break, and inter-digit duration are measured and displayed for dial pulse digits. The CLEAR button 214b must be depressed to clear display 216 prior to receiving or transmitting the next number sequence.

Figure 2A:
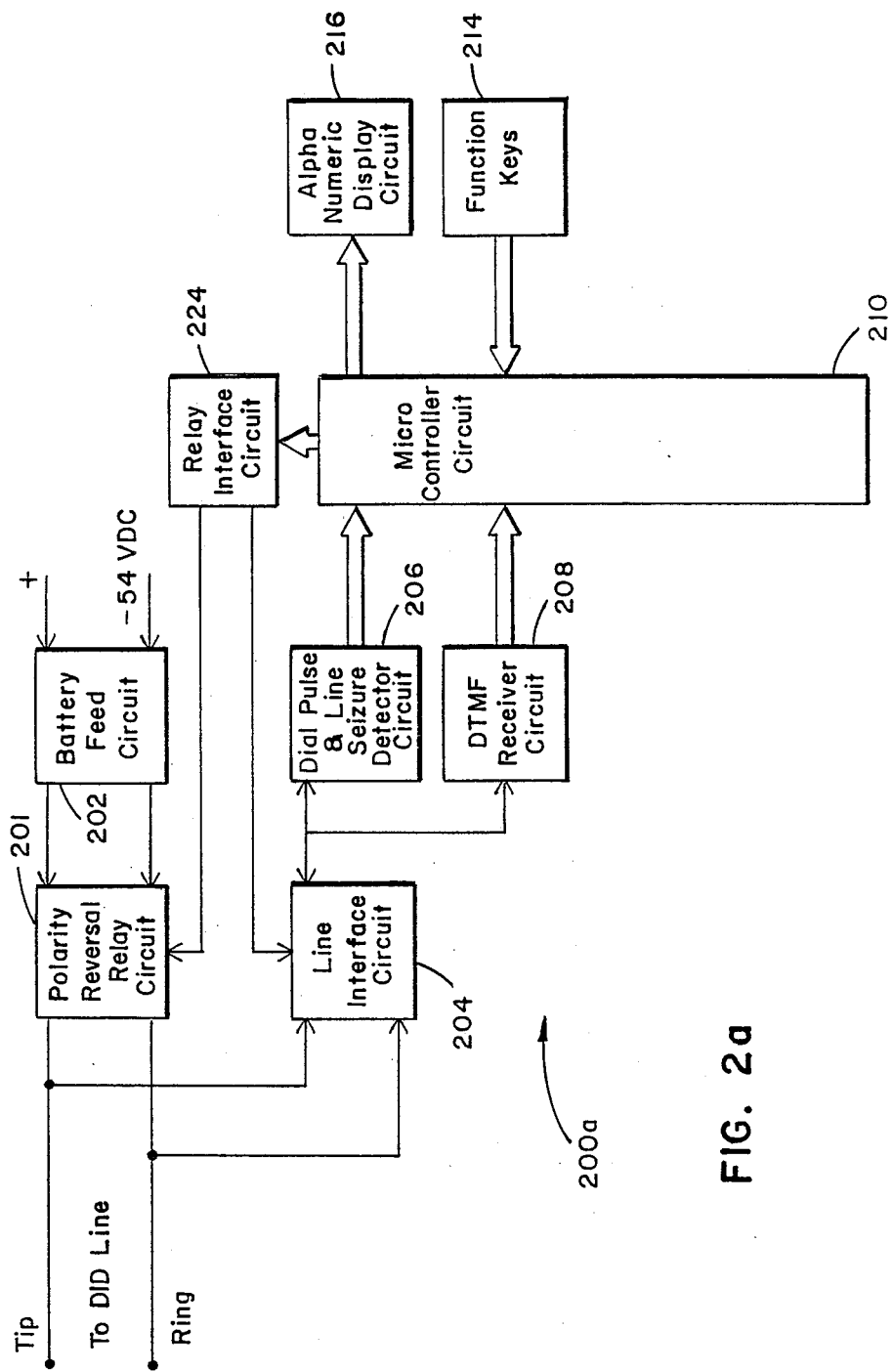
FIG. 2a is a functional block diagram of a hand-held DID telephone line signaling test instrument.

Referring to FIG. 2a, a preferred embodiment of the present invention is described. Reference number 200a generally refers to the first preferred embodiment of the present invention, which is a specific application of the present invention to only testing DID trunk lines employing either dial pulse or DTMF dialing codes. With the description of the first preferred embodiment 200a along with the description of the more general second preferred embodiment 200 (described below), those skilled in the art will readily recognize the application of the present invention specifically to DID trunk lines, DOD trunk lines, and POTS trunk lines employing either dial pulse, MF, DTMF, or call progress tones.

Referring to FIG. 2a, a polarity reversal relay circuit 201 is placed between the DID trunk line and a battery feed circuit 202. The polarity reversal relay serves to generate a wink by reversing the polarity of talk battery voltage placed between the tip and ring wires on the DID line. The battery feed circuit obtains its approximate −48VDC talk battery voltage from a −54VDC voltage source.

A line interface circuit 204 is connected across the tip and ring wires of the DID line and serves to receive the signaling and dialing codes from the central office for test and measurement. A detector circuit 206 is connected to the line interface circuit 204 and serves to detect and verify the line seizure and also serves to detect dial pulse dialing codes. A DTMF receiver circuit 208 is also connected to the line interface circuit 204 to receive and decode DTMF dialing codes. Both detector circuit 206 and receiver circuit 208 are connected by data bus lines to a microcontroller circuit 210. The microcontroller circuit 210, in the preferred embodiment, includes a micro-controlled chip incorporating a microprocessor, RAM EPROM and I/O control logic. The microcontroller circuit operates to measure the timing, amplitude and appropriate signaling received along the DID trunk from the central office. The test and measurement results of these parameters are then displayed on alphanumeric display circuit 216. A relay interface circuit 224 serves to control the line interface circuit 204 and the polarity reversal relay circuit 201.

Figure 2B:
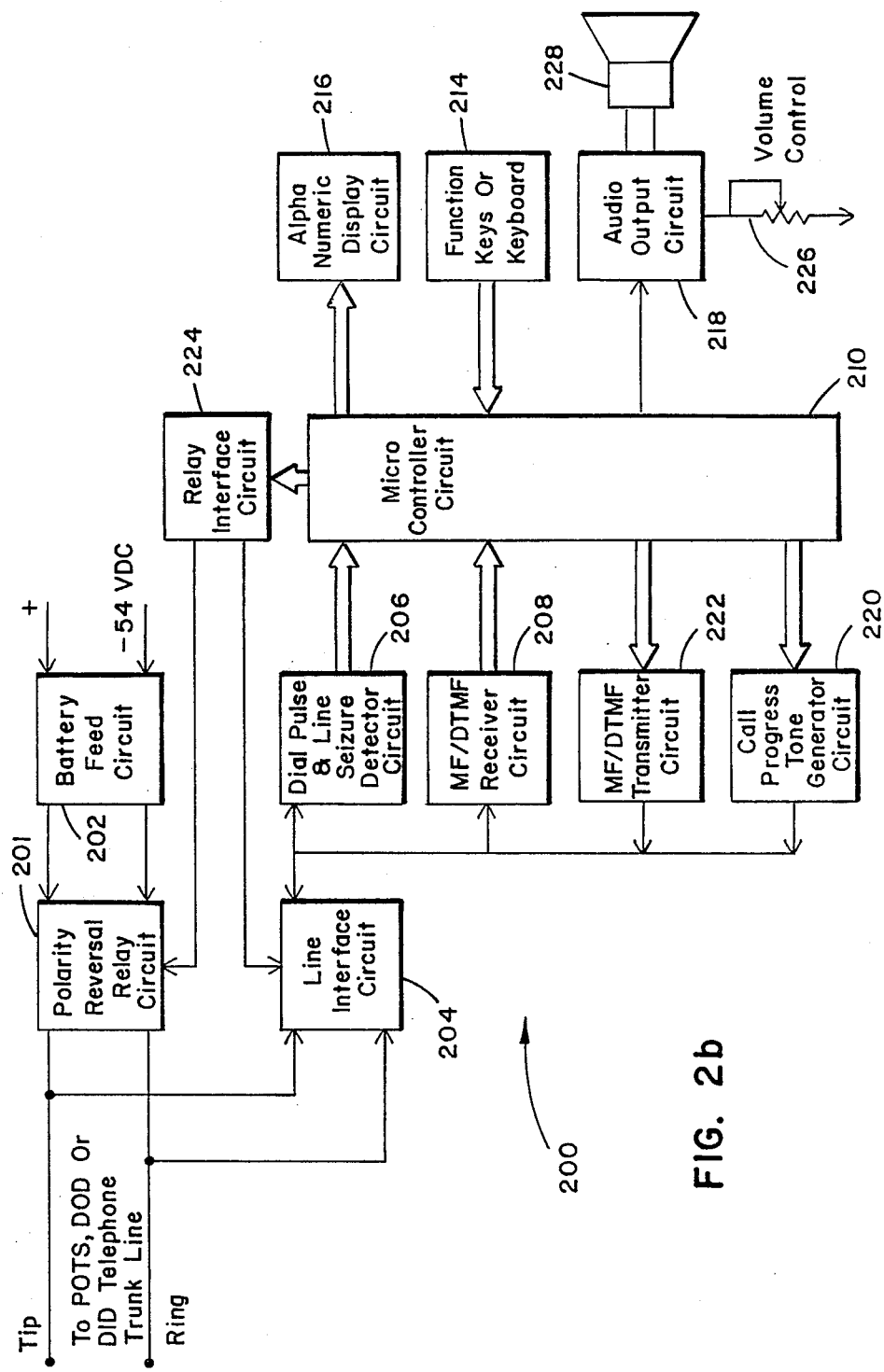
FIG. 2b is a functional block diagram of a hand-held DID, DOD and POTS signaling test instrument.

Referring to FIG. 2b, the second preferred embodiment 200 is described which is more generally applicable to DID, DOD or POTS leased lines employing either dial pulse, MF, DTMF or CALL PROGRESS tones. A polarity reversal relay circuit 201 is placed between the tip and ring wires and a battery feed circuit 202 to source talk battery voltage and to provide a reverse polarity wink for DID lines. Line interface circuit 204 is also connected to the tip and ring wires and is capable of providing a DC load impedance to terminate either a DOD or POTS line. This termination impedance may also be controlled to rapidly open and close the line to transmit dial pulse codes.

Four major circuits are connected between the line interface circuit 204 and microcontroller 210. A detector circuit 206 serves to receive dial pulse codes and to detect or verify line seizure. A receiver circuit 208 serves to receive MF or DTMF dialing codes. A transmitter circuit 222 serves to transmit MF or DTMF dialing codes. A tone generator circuit 220 serves to generate the CALL PROGRESS tones.

The microcontroller circuit 210 transmits and receives information on the tip and ring wires of the telephone line and displays the results of the test and measurements on alphanumeric display circuit 216. User selectable operational options can be input through keyboard circuit 214. The tones can be monitored by the user through the use of audio output circuit 218 so that speaker 228 monitors the tones on the tip and ring wires of the telephone line. Relay interface circuit 224 serves to control the polarity reversal relay through microcontroller 210.

Polarity reversal relay 201 allows the test instrument 200 to send a polarity reversal wink to a DID line to inform the central office that the interface recognizes that the central office has seized the DID trunk and is requesting to send the digits of the dialed extension. The termination impedance within the line interface circuit 204 allows the test instrument 200 to terminate a DOD trunk to inform the central office that the PBX has seized the DOD trunk and is requesting to send the digits of the dialed telephone number. A second termination impedance within the line interface circuit 204 allows termination and pulse dialing of a POTS line.

The MF/DTMF receiver circuit 208 serves to receive the transmitted digits of the dialed extension in a DID or POTS application. Circuit 208 is connected to microcontroller circuit 210 by a data bus. The received dialing codes in either format are converted to binary digits of dialed information and transferred to the microcontroller on a real-time basis for tone duration and inter-digit timing analysis.

FIGS. 3-9 comprise detailed electric schematic diagrams of the implementation of the second preferred embodiment of the present invention. This implementation includes all the functionality associated with the second preferred embodiment 200 of FIG. 2b. Those skilled in the art will readily recognize that the detailed electrical description of the first preferred embodiment 200a of FIG. 2a is contained in the schematic diagrams of FIGS. 3-9 and can be implemented by merely disabling certain functional features.

Figure 3:
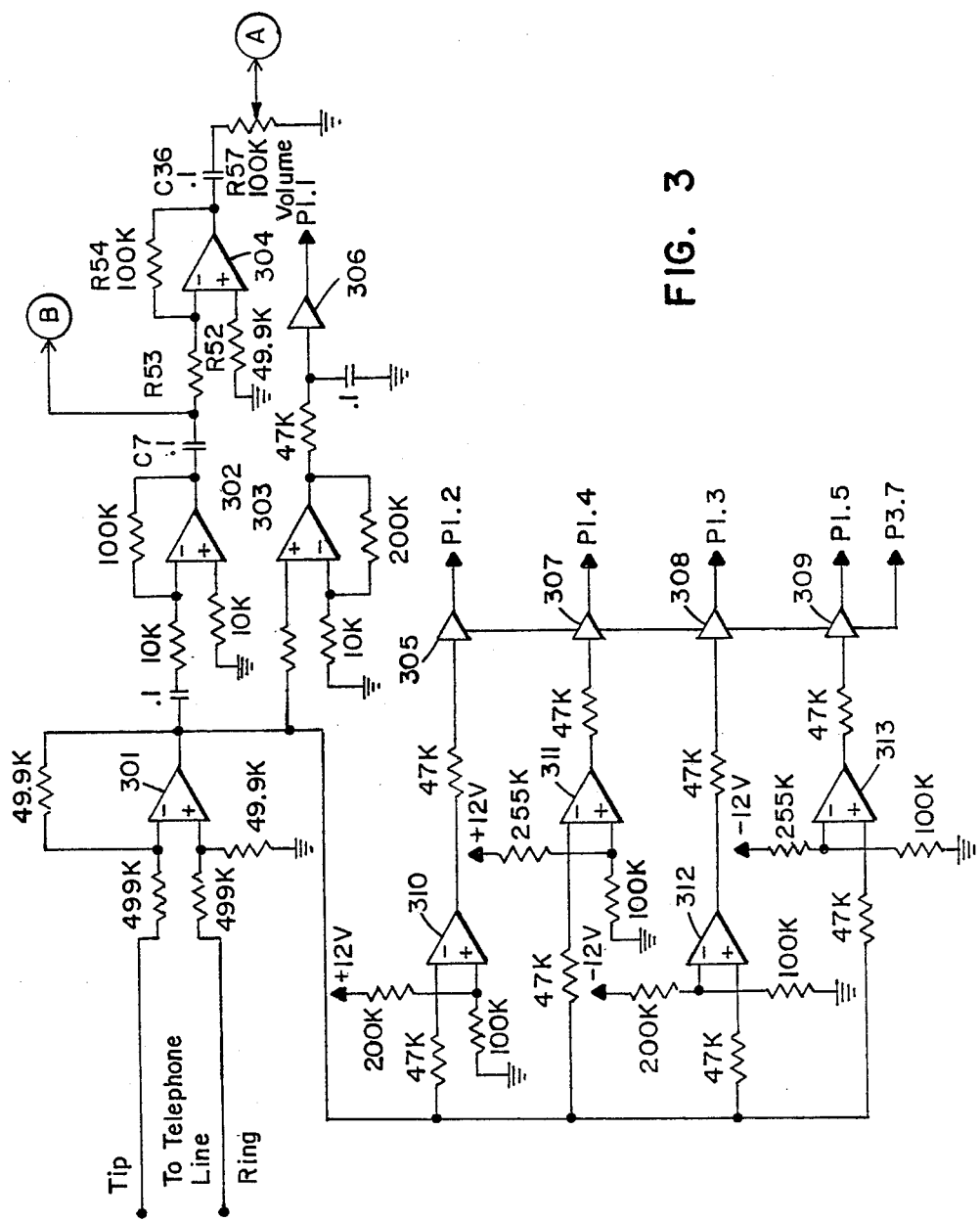

FIG. 3 shows a portion of the preferred embodiment of the telephone line signaling test instrument 200 which is connected to the tip and ring conductors of the telephone line for receiving incoming signals. The incoming signals are DC coupled to operational amplifier 301 which in the preferred embodiment is part No. LM324 available from National Semiconductor and other vendors. Operational amplifier 301 is connected with associated resistors to provide a gain of one-tenth to increase the common mode range of operational amplifier 301 while the inputs are coupled in differential mode. The reduced signal output of operational amplifier 301 is then distributed to operational amplifiers 302, 303, 310, 311, 312, and 313.

The signal input for tone analysis to the test instrument 200 is through operational amplifier 302. This operational amplifier is also part No. LM324 and is connected to have a gain of approximately ten. The output of operational amplifier 302 is AC coupled to continuation bubble B, also shown in FIG. 5. The output of operational amplifier 302 is also distributed to operational amplifier 304, which is also part No. LM324 and is connected to have a gain of approximately one-fourth. The output of operational amplifier 304 is connected through a volume control variable resistor R57 through continuation bubble A to the audio amplifier circuit of FIG. 8 (discussed below) for monitoring the audio signals on the telephone line.

Operational amplifier 303 receives the signals from operational amplifier 301 for sensing wink protocol in DOD applications of the test instrument 200. Operational amplifier 303 is in the preferred embodiment also part No. LM324 available from National Semiconductor, and is wired for an approximate gain of twenty. The output of operational amplifier 303 is buffered through tri-state buffer gate 306 and received by microcontroller chip 401 of FIG. 4 (discussed below) on I/O port P1.1. The microcontroller chip is programmed to carefully time the wink interval, which should fall between approximately 120-290 milliseconds. The microcontroller senses the wink and times the duration and compares it against stored parameters to determine if it is within acceptable limits. The results of this analysis would be displayed on the display circuit 216.

The signals from operational amplifier 301 are also distributed to operational amplifiers 310, 311, 312 and 313 which form threshold detect circuits for pulse dialing and line seizure detection. The noninverting inputs to operational amplifiersS 310, 311, 312 and 313 have a threshold voltage applied which is derived through a resistive ladder. The incoming signal is applied to the inverting inputs of operational amplifiers 310, 311, 312 and 313 for comparison to the preselected thresholds. The output of these operational amplifiers are applied through tri-state buffer gates 305, 307, 308 and 309 respectively for receipt by microcontroller chip 401 along I/O ports P1.2, P1.4, P1.3 and P1.5. Tri-state buffer chips 306, 305, 307, 308 and 309 are all commonly controlled by a dedicated control line attached to I/O port P3.7 on microcontroller 401. Operational amplifier 310 serves to detect a high threshold signal of normal polarity, whereas operational amplifier 311 is connected to detect a low threshold signal of a normal polarity. Operational amplifier 312 is connected to detect a high threshold signal of a reverse polarity, while operational amplifier 313 is connected to detect a low threshold signal of a reverse polarity. The results of these comparisons is placed on four I/O ports of microcontroller 401 which are four lines of an eight-line data but used for distribution of data under control of the microcontroller throughout the test instrument 200.

Figure 4:
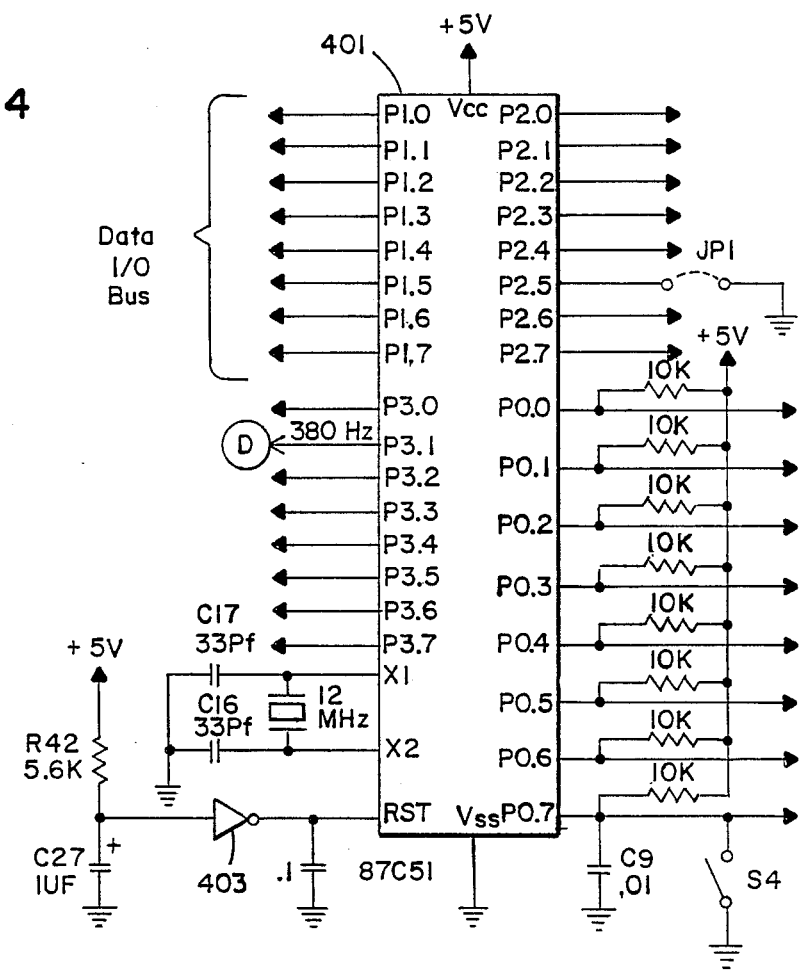
Figure 4:
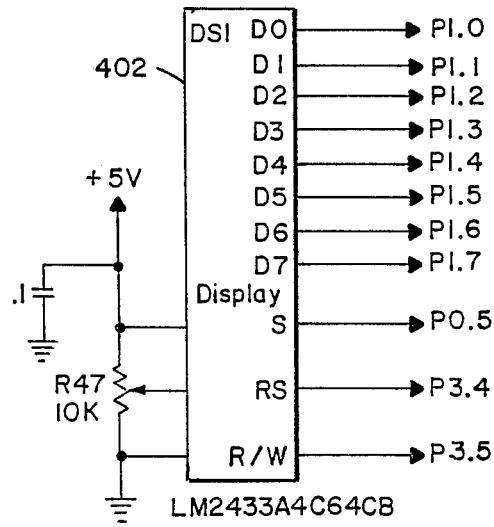

FIG. 4 shows the microcontroller chip 401 used in the preferred embodiments of the present invention. This chip is an Intel 87C51 CMOS single-chip 8-bit microcomputer with an onboard microprocessor, EPROM memory and RAM scratchpad memory. The architecture of this microcontroller includes four 8-bit I/O ports which are wired in the preferred embodiments to control the operation of the signaling test instrument 200. In the preferred embodiments of the present invention shown, several of the ports are wired to perform dual functions by time multiplexing the operation of the ports, as in the technique described above for the tri-state data bus on ports P1.0 through P1.7. These ports form an 8-bit-wide data I/O bus which is used to control the operation of the present invention and to distribute data throughout the device. For example, the intelligent display 402 has the data input lines D0-D7 connected to the data I/O bus ports P1.0-P1.7 connected to microcontroller chip 401. In this fashion, using time multiplex control, the microcontroller 401 can display information on the intelligent display 402.

Intelligent display module 402 is in the preferred embodiment part No. LM2433A4C64CB, available from Densitron Corporation of Torrence, Calif. Intelligent display module 402 is in the preferred embodiments a 64-character, four-line alphanumeric LCD display including internal ROM for display formatting. The display is driven from the data I/O bus with ASCII characters which are then displayed on the LCD face. Control lines are connected to ports P0.5, P3.4 and P3.5, and the display is connected according to manufacturer's specifications. Those skilled in the art will readily recognize a wide variety of displays which may be implemented to provide an indication of the results of the test functions of the signaling test instrument 200.

Microcontroller chip 401 is also connected according to manufacturer's specification. Four 8-bit I/O ports are arranged to transmit and receive information and control signals. Ports P0.0-P0.7 are an open collector output of the Intel 87C51 microcontroller and hence require pull-up resistors to function properly. A 12-MHz crystal is connected to the crystal inputs to provide the clocking and timing functions of microcontroller chip 401 while a power-up reset circuit is connected through inverting buffer 403 to provide a power-up reset upon initial application of the power. Switch S4 shown in FIG. 4 corresponds to button 214g shown in FIG. 1. This switch controls the hook status of the test instrument 200 to place the device either on-hook or off-hook.

Microcontroller chip 401 is also programmed to generate a 380-Hz square wave on port P3.1 for use by test instrument 200 in communicating with certain functions of pay phones. The 380-Hz square wave is passed through connection bubble D to FIG. 9.

Figure 5:
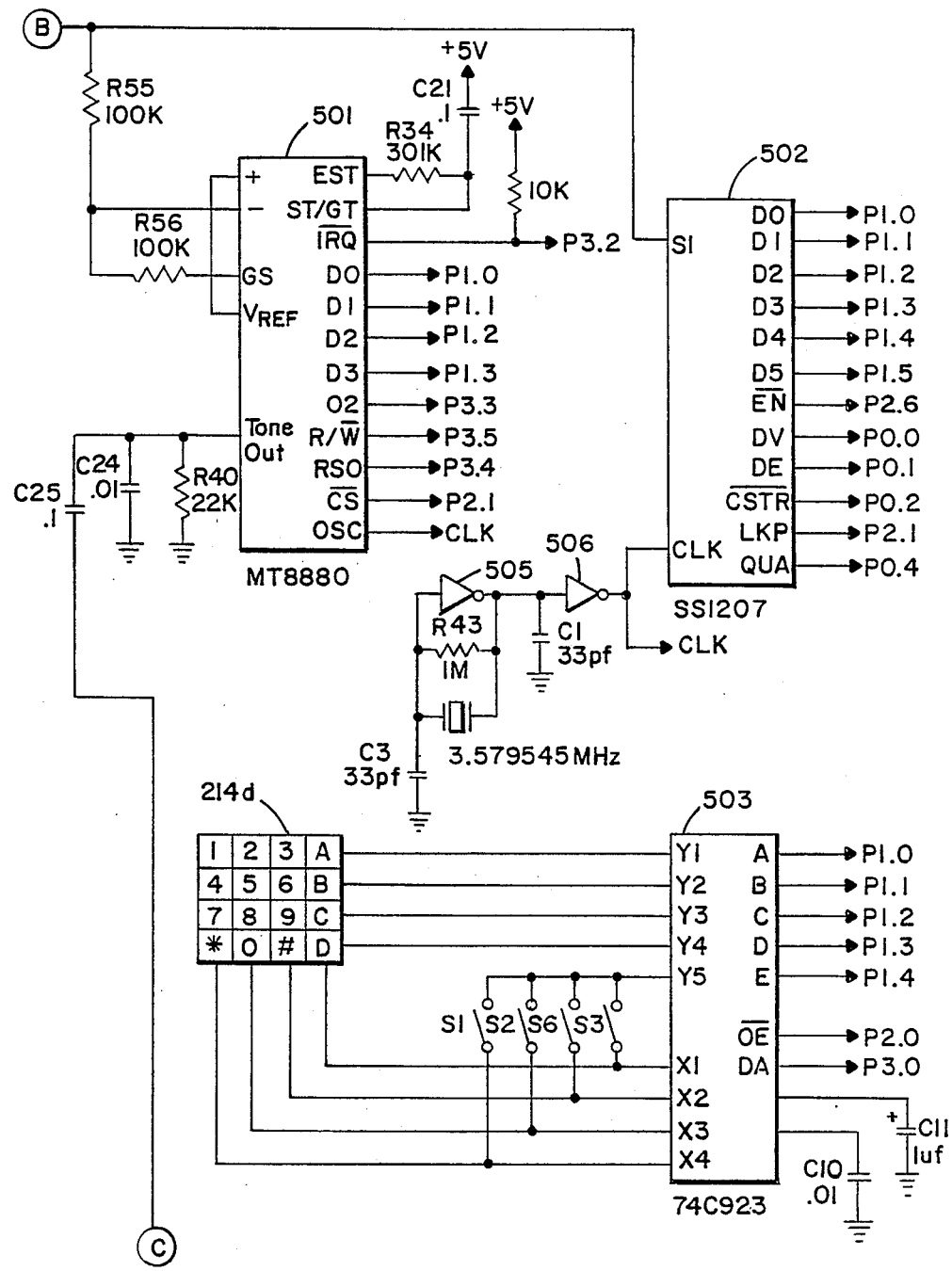

FIG. 5 shows the DTMF and MF receivers, the DTMF transmitter, the keyboard and keyboard encoding logic. The DTMF transmitter and receiver is actually contained in the single chip 501 which in the preferred embodiment is a DTMF transceiver chip part No. MT8880 available from Mitel Corporation. This commonly available chip receives its signals from connection bubble B of FIG. 3 which is connected to the input amplification stage from the telephone line. DTMF transceiver 501 is connected according to manufacturer's specifications and serves to decode received DTMF signals into a 4-bit binary code presented on the output data lines D0-D3. The DTMF transceiver also serves to receive 4-bit binary codes on data lines D0-D3 and produces the DTMF tones on the TONE OUT line. The tone output of chip 501 is sent through connection bubble C to FIG. 6 where it is summed with other tone outputs and placed on the telephone line.

The incoming signals from the telephone line through connection bubble B are also routed to MF receiver chip 502 which in the preferred embodiment is part No. SSI207 available from Silicon Systems Incorporated. This commonly available MF receiver chip is designed to decode multifrequency tones into 6-bit binary codes. The binary codes corresponding to the decoded tones are placed on output lines D0-D3 and presented to I/O ports P1.0-P1.5, respectively, of microcontroller chip 401. The MF receiver chip 502 is connected according to manufacturer's specifications, and those skilled in the art will readily recognize that the data bus outputs of chips 501 and 502 are tri-state controlled for time multiplex connection to the I/O ports of microcontroller chip 401. Microcontroller chip 401 uses control lines on the various chips as shown in FIGS. 4 and 5 to control the tri-state selection such that only one chip is driving or receiving on the common I/O ports at a given time.

Function control lines for the MF receiver chip 502 and the DTMF transceiver chip 501 are also connected to various I/O ports of microcontroller chip 401, as shown in FIGS. 4 and 5. Unlike the shared data bus lines, the control lines for chips 501 and 502 must be attached to dedicated I/O ports since the time sharing of control lines is difficult to time multiplex and would require additional hardware.

The keypad 214D shown in FIG. 5 (also shown in FIG. 1) is a matrix-addressed keypad with the row/-column signal lines being encoded by keyboard encoder chip 503. Encoder chip 503 is in the preferred embodiment part No. 74C923 CMOS keyboard encoder with three-state outputs available from National Semiconductor. This encoder chip has a 20-key capability, and so four additional switches are connected as shown in FIG. 5 to provide additional encoding of the push buttons on the face of the test instrument 200. Referring briefly to FIG. 1 taken in conjunction with FIG. 5, push button 214a corresponds to switch S1, push button 214b corresponds to switch S2, push button 214e corresponds to push button S6, and push button 214f corresponds to switch S3.

The data output of keyboard encoder chip 503 is a 5-bit binary code placed on the data bus ports P1.0-P1.4. Through this port, the microcontroller 401 can scan the keyboard for keys depressed or push buttons depressed to determine the functions or data being input to test instrument 200.

DTMF transceiver chip 501, MF receiver chip 502, and tone generator chips 602 and 603 of FIG. 6 (discussed below) all require a clocking frequency from a 3.58 MHz crystal. The designers of these chips recognize that more than one of these chips may be connected in a single circuit, and hence to save board space and cost, allow the chips to be daisy-chained and controlled from a single crystal. Thus, a crystal oscillator shown in FIG. 5 is used to generate the clocking frequency from a 3.579545 MHz crystal (an inexpensive NTSC color subcarrier frequency crystal). The output of this oscillator is squared up using inverting buffer gates 505 and 506 and the clock signal is distributed on the line marked CLK. Thus, all four of the aforementioned chips share the single approximate 3.58 MHz clocking signal.

Figure 6:
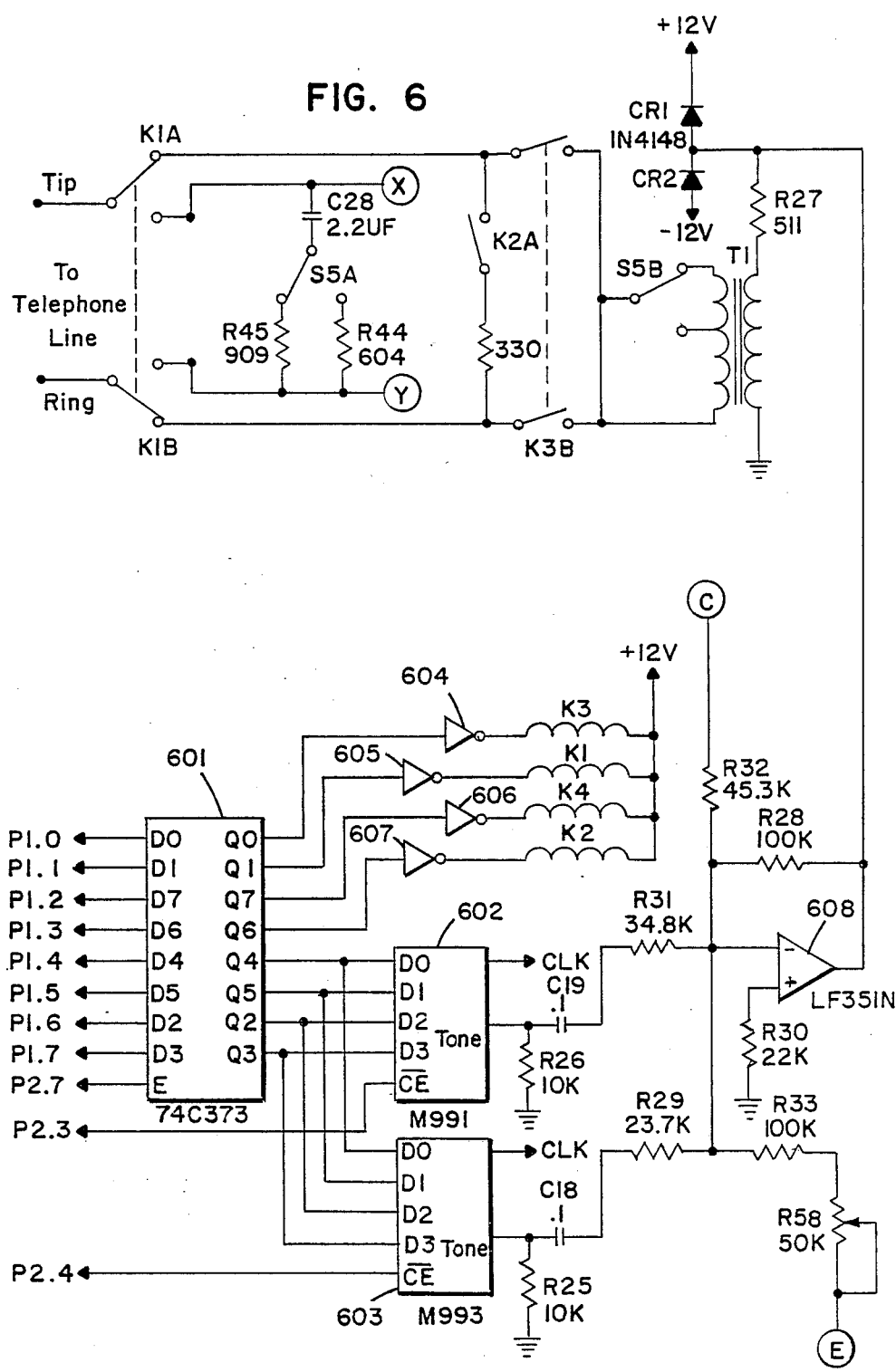

FIG. 6 shows portions of the detailed electrical implementation of the line interface circuit 204, the relay interface circuit 224, and the call progress tone generator circuit 220. On the left of FIG. 6, the tip and ring connections of the telephone line shown in FIG. 3 are also connected in FIG. 6 to the inputs of relay contacts K1A and K1B. The control winding for this relay is labeled K1. Relay K1 is a double-pole/double-throw relay which may be implemented using a variety of means including solid state relays or electromechanical relays. Relay K1, shown in the normal closed position in FIG. 6, is set to transmit information on the telephone line. By switching relay contacts K1A and K1B from their shown position, the tip and ring wires will be connected to connection bubbles X and Y which will provide talk battery voltage onto the telephone line. This would be required in DID mode where the talk battery must be sourced for a DID trunk line. The talk battery voltage and its associated polarity reversal relay is discussed in conjunction with FIG. 7 below.

Relay contact K2A and its associated control coil K2 serve to place a 330-ohm DC termination impedance across the tip and ring wires of the telephone line when the K1 relay is in its normally closed position as shown in FIG. 6. Thus, relay K2 serves to terminate a POTS line in loop normal operation.

Relay contacts K3A and K3B are controlled by coil K3 and serve to connect the tone generator circuits of test instrument 200 to the tip and ring wires of the telephone line. Switch S5A switches between 900 and 600 ohms termination impedance and corresponds to switch 214c shown in FIG. 1. Switch S5B is ganged with switch S5A and also corresponds to switch 214C of FIG. 1. Switch S5B selects the output termination impedance in transmission mode by switching between windings of output impedance matching transformer T1.

The primary of transformer T1 is driven from operational amplifier 608 which is in the preferred embodiment part No. LF351N available from National Semiconductor and other vendors. This amplifier has a gain of approximately four. The tones to be transmitted onto the tip and ring wires of the telephone line are summed at a summing point connected to the inverting input of operational amplifier 608. Thus, connection bubble C receives the DTMF transmitted tones, and also the MF tones from MF transmitter chip 603 and the CALL PROGRESS tones from call progress tone generator chip 602. Also connected to the summing point at the inverting input to operational amplifier 608 is the output of the 380-Hz tone generator circuit of FIG. 9. Thus, this tone is also summed through variable resistor R58 which is used to adjust the level of the output of the tone generator shown in FIG. 9.

Chip 601 is in the preferred embodiment part No. 74C373, which is a CMOS octal D-type transparent latch chip having eight latches contained in a single chip. The inputs to these eight latches are from the data bus lines P1.0–P1.7 from port 1 of microcontroller 401. The outputs of these eight latches are used to control the relay coils K1–K4 and the tone generator chips 602 and 603. The outputs from the latches of chip 601 are 3-state bus driver outputs and hence can be used to control chips 602 and 603 in a time multiplex fashion by using the chip enable inputs of chips 602 and 603 connected to dedicated control lines P2.3 and P2.4 respectively on microcontroller chip 401.

Relay coils K1, K2, K3 (discussed above) and K4 (discussed below in conjunction with FIG. 7) are controlled by latch chip 601 through buffers 604, 605, 606 and 607 respectively. These relay coils could be part of electromechanical relays or could be made part of solid state relays, as is well known to those skilled in the art. An example of a solid state relay which could be used in the preferred embodiment of the present invention would be part No. LH1065 available from AT&T and commonly used in the telephone industry. These solid state relays use optically isolated control lines and offer nearly zero crosstalk between the control lines and the relay contacts while offering very low contact impedance in the closed state. Solid state relays are designed to handle an extremely high number of closings without degradation in performance.

CALL PROGRESS tone generator 602 is in the preferred embodiment part No. M-991 available from Teltone Corporation. Chip 602 is connected according to manufacturer's specification to produce the audible tones sent from switching systems to calling parties to show the status of calls. The calling party can identify the success of a placed call by what is heard after dialing. CALL PROGRESS tone generator 602 produces the dual tones or single tones of the appropriate frequencies to signal, for example, dial tone, audible ring back, busy, call waiting, reorder, etc. Many of these tones must be cycled ON and OFF to produce the requisite signal. Control by microcontroller chip 401 carefully controls the timing of these signals. For example, the busy signal is a combination of a 480-Hz tone and a 620-Hz tone repeated on and off at 500 millisecond intervals. An audible ring back is a combination of a 440-Hz tone and a 480-Hz tone repeated such that the tones are ON for one second and OFF for three seconds. The standard CALL PROGRESS tones and the timing are well known to those skilled in the art.

The tones are selected by the data bus inputs D0–D3 on chip 602. The generation of these tones is under control of the 3.58 MHz clock signal derived in FIG. 5. The output of tone generator 602 is driven to the summing point at the inverting input of operational amplifier 608.

The multifrequency tone generator 603 is in the preferred embodiment part No. M-993 available from Teltone Corporation. This tone generator produces MF tone pairs used in trunk signaling. The tones generated conform to CCIT R1 signal recommendations and to the AT&T MF standards. The MF tone signals are used between telephone offices and between telephone company central office switching equipment and customer equipment such as PBX systems. The duration and selection of the multifrequency pairs are digitally controlled according to the data lines on inputs D0–D3. Multifrequency tone generator chip 603 is connected according to manufacturer's specifications to produce the required tone pairs on the tone output. The output of multifrequency generator 603 is also driven to the summing point at the inverting input of operational amplifier 608.

Figure 7:
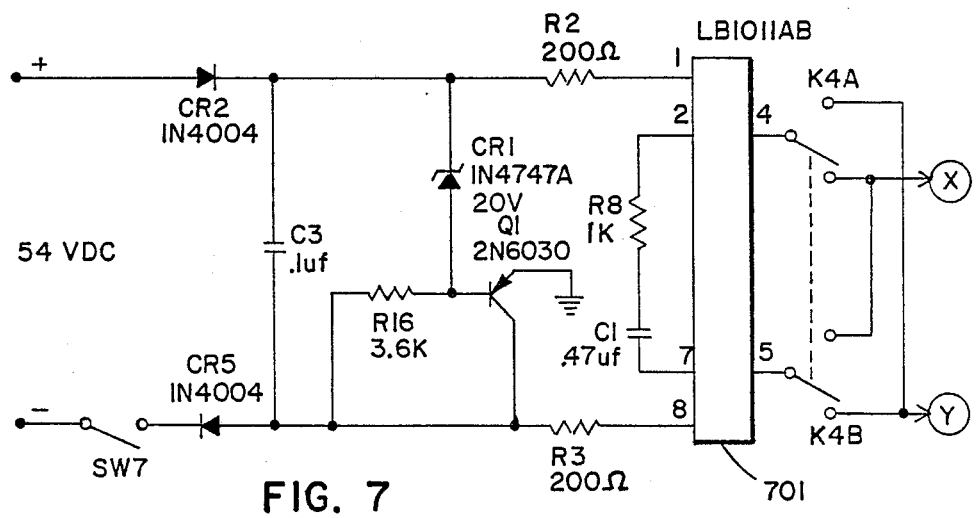
FIGS. 3–9 are detailed electrical schematic diagrams showing the specific implementation of the preferred embodiment of the present invention.

The battery feed circuit for producing the talk battery voltage is shown in FIG. 7. A 54VDC source must be coupled through power connector 103 of FIG. 1 of sufficient current capacity to generate the voltages necessary to produce talk battery and also to produce the operating voltages for the test instrument 200. Input protection diodes CR2 and CR5 are used to ensure that reverse polarity voltage is not applied to the unit. The −48VDC input voltage is applied to battery source chip 701, which in the preferred embodiment is part No. LB1011AB available from AT&T. This is a commonly available integrated circuit which is used in the telephone industry as an electronic battery feed circuit which supplies DC currents to a telephone line with minimal loading on the AC signals. This battery feed chip 701 is connected according to manufacturer's specifications and supplies a −48VDC to the telephone line through relay contacts K4A and K4B through connection bubbles X and Y respectively.

Switch SW7 is the main POWER ON switch and is ganged with the volume control variable resistor R57 of FIG. 3, both of which correspond to the power/volume control 101 shown in FIG. 1. The Zener diode CR1 connected between the positive rail and the base of transistor Q1 serve to generate a phantom ground or system common located between the ±54VDC voltage rail. In this fashion, system power can be generated from the plus or minus voltage rails using, for example, monolithic voltage regulators to generate the +5VDC and ±12VDC supply voltages (not shown). Those skilled in the art will readily recognize that a wide variety of methods can be used to generate the supply voltages for the present invention.

Relay contacts K4A and K4B under control of relay coil K4 shown in FIG. 6 serve to generate the reverse battery wink signal on the telephone line produced by the monitor 200. Relay contacts K4A, K4B are shown in their normal polarity mode. By switching the relay coil K4, a reverse polarity can be generated on connection bubbles X and Y.

Figure 8:
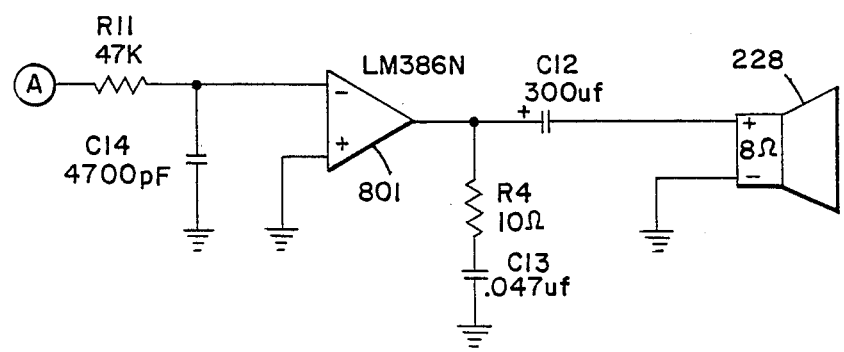

FIG. 8 shows an optional amplifier circuit and speaker for allowing monitoring of the signals on the telephone line. Amplifier 801 is a monolithic audio amplifier chip, part No. LM386N available from National Semiconductor. This monolithic audio amplifier takes the signals from connection bubble A and drives an 8-ohm impedance speaker 228 to allow the user to monitor the signals on the telephone line.

Figure 9:
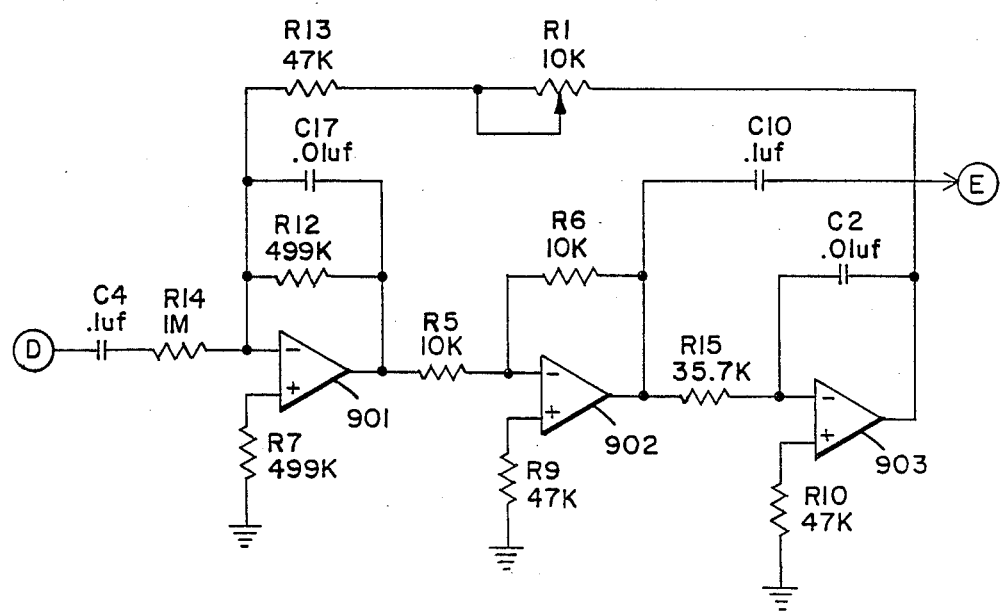

FIG. 9 shows a 380-Hz tone generator circuit which takes a 380-Hz square wave signal from microcontroller chip 401 through connection bubble D and produces therefrom a sinusoidal 380-Hz tone on output connection bubble E. Operational amplifiers 901, 902 and 903, along with the associated components, form a square wave-to-sine wave converter using a quad bandpass filter. Operational amplifiers 901, 902 and 903 are in the preferred embodiment part Nos. LM324 available from National Semiconductor and other vendors.

Figure 10:
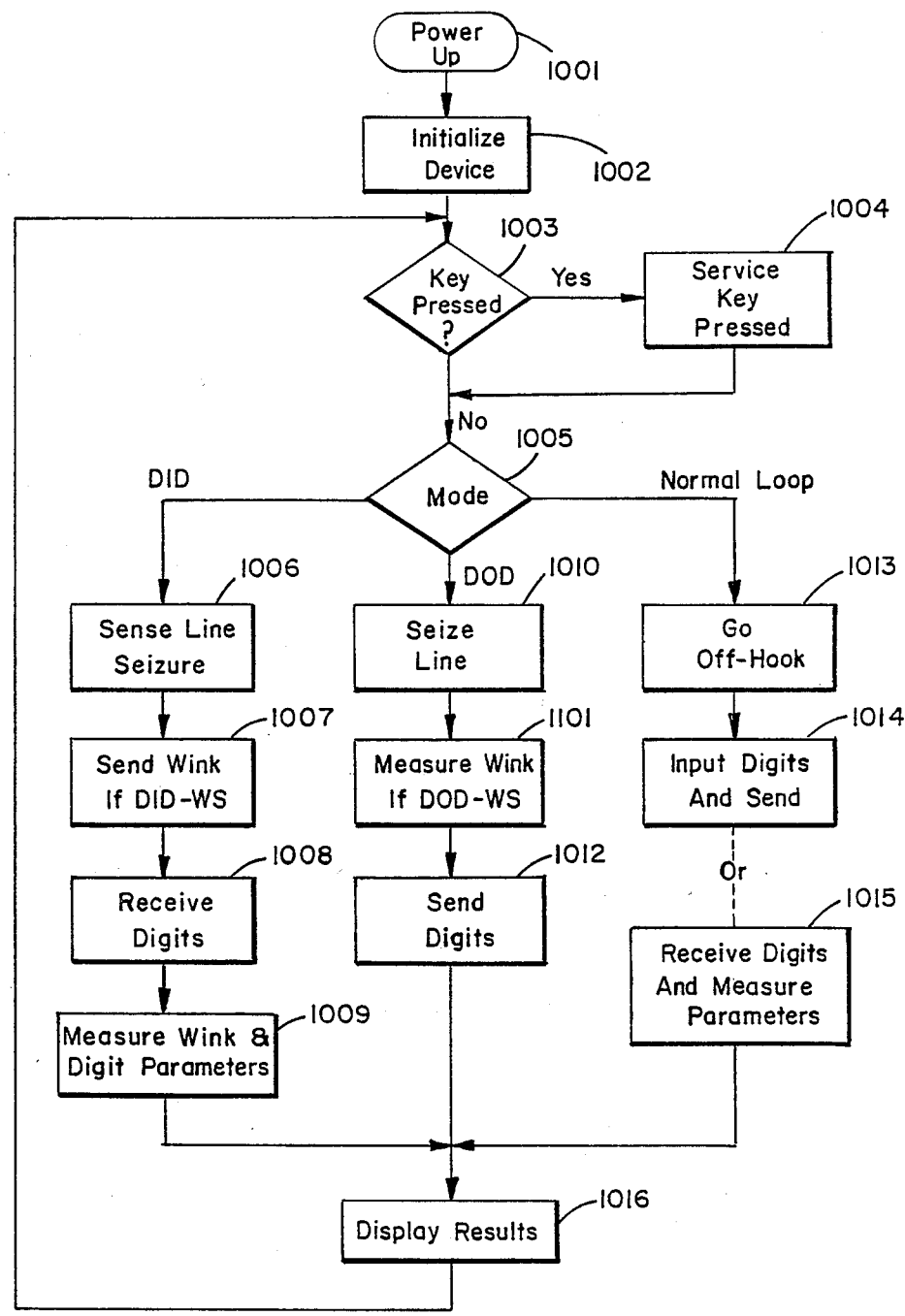
FIG. 10 is an operation flow chart for programming the microcontroller of the hand-held telephone line signaling test instrument.

FIG. 10 is a high-level control flow chart of the software control program sequence contained in the EPROM program memory of microcontroller chip 401 for the signaling test instrument 200. Those skilled in the art will readily recognize the translation of this control sequence into the appropriate microprocessor control commands necessary to operate the interface 100.

The system begins its operation upon application of the power, as indicated at location 1001 of FIG. 10. The application of power causes microcontroller chip 401 to do a power-up reset, which then begins an initialization routine to clear all of the appropriate registers, and place the device in its default operating mode. Control is then transferred to decision diamond 1003 which scans the keys and keyboard to determine whether any keys have been pressed. If a key has been pressed, control is passed to command box 1004 which services each key according to its function.

If, for example, the SCAN key is pressed and held for more than two seconds, a 380-Hz tone is generated by microcontroller chip 401 and the tone generator circuit of FIG. 9. Relay contacts K3A and K3B of FIG. 6 will close to allow the tones to be transmitted onto the tip and ring wires of the telephone line. The other keys of the keypad or front face of instrument 200 are processed in a similar fashion. If, for example, the numeric keypad is pressed, the digits are stored in memory or the call progress tones are stored in memory, depending on the dialing mode of operation previously selected.

Control is passed from command box 1004 and from decision diamond 1003 to decision diamond 1005. At this point in the control flow, decision diamond 1005 determines the major control flow of the software, depending upon which mode of operation has been selected for instrument 200. The control flow path to the left of FIG. 10 is for DID mode of operation, the control flow path down the middle of FIG. 10 is for DOD operation, while the control flow path for the right side of FIG. 10 is for normal loop operation. Regardless of the control flow, the results of the test and measurements are displayed in command box 1016 and control flow is returned to decision diamond 1003 to continue processing or waiting for a next mode of operation.

Control is passed from decision diamond 1005 to command box 1006 in DID mode of operation. In this mode, the signaling test instrument 200 monitors the telephone line to sense a line seizure by the central office. When a line seizure occurs on a DID line, instrument 200 may send a wink if DID-WS (wink start) mode of operation has been selected. The wink start is carefully timed after an appropriate wait period after the line seizure (for example, approximately 30 milliseconds). After the reverse battery wink is transmitted on the telephone line to the central office, test instrument 200 times the amount of time the central office takes after the termination of the wink to begin transmitting the dialing digits. Control is passed to command box 1008 where the test instrument 200 receives the dialed digits in whatever dialing mode the central office selects. For example, a telephone number may be received using DTMF tones preceded by a billing number transmitted in MF tones. It does not matter which dialing mode the central office uses and how it is intermixed since the signaling test instrument 200 will decode any mode used on the telephone line.

After the digits are received and stored in memory, control flow is passed to decision box 1009 where the test instrument 200 performs magnitude and timing measurements on the received digits and on the wink protocol and compares these measured parameters with stored parameters to determine whether they are in range. Control flow is passed to decision box 1016 where the results of this analysis are displayed. At this part of the control flow, the user can use the SCAN key 214f to scan the cursor along the received digits to determine, for example, the inter-digit spacing, and the tone duration for DTMF timing or the pulses per second, the percent break in the inter-digit spacing for dial pulse timing. For wink timing, the pre-wink period and the post-wink period can be displayed.

Control passing from decision diamond 1005 to command box 1010 is performed in DOD mode of operation. In this mode of operation, the digits to be transmitted are preloaded into memory and the device seizes the telephone line and begins timing. Control is passed to command box 1011 where, if the device is operating in DOD-WS (wink start) mode of operation, the test instrument 200 will measure the pre-wink, wink, and post-wink time intervals in which the central office responds. Control is passed to command box 1012 where the test instrument 200 transmits the dialed digits at a standard dialing rate. Control is then passed to command box 1016 where once again the display shows the results of the test and measurements.

Control passing from decision diamond 1005 to command box 1013 occurs in normal loop mode of operation of test instrument 200. In this operation, the test instrument is connected to a POTS or normal loop trunk telephone line, for example between central offices. To initiate operation, the user must manually go off-hook by depressing the hook status button 214g. It should be noted that in normal loop operation, the device can operate either as a transmitter or receiver to determine status on normal loop telephone lines. Thus, control may pass from command box 1013 to either 1014 or 1015, depending upon whether the test instrument 200 will send the digits or receive the digits and measure the parameters.

When transmitting the digits at command box 1014, the user may input the digits and transmit them on a real-time basis or the user may input the digits to be stored in memory and have them transmitted at a standard speed. In normal loop mode of operation, as is also the case in DID and DOD modes of operation, any one of the pulse dial, DTMF, MF or CALL PROGRESS tones may be used.

If test instrument 200 is used to receive digits in normal loop operation, control is passed to command box 1015 where the digits are received, stored in memory and measured against standard parameters stored in memory. Control is then passed to command box 1016 where the results of the test and measurements are displayed.

For testing between central offices on trunk lines, for example, dialing codes may be a mixture of MF, CALL PROGRESS and DTMF tones. As described above, test instrument 200 is capable of receiving mixed mode dialing codes and decoding them. Test instrument 200 is also capable of transmitting mixed mode dialing codes by loading the dialing string into memory and changing the dial mode between digits. For example, a 6-digit billing code may first be loaded into memory using MF dialing codes via the numeric keypad. The user then selects DTMF dialing mode and the 9-digit address of the called party is then loaded into memory. The look status button is then pressed, which places test instrument 200 off-hook and after an appropriate delay will transmit the stored dialing code in mixed mode.

While the present invention has been described in connection with the preferred embodiment thereof, it will be understood that many modifications will be readily apparent to those of ordinary skill in the art, and this application is intended to cover any adaptations or variations thereof. Therefore, it is manifestly intended that this invention be limited only by the claims and the equivalents thereof.

What is claimed is:

1. A hand-held signal and test instrument for testing a DID trunk (swap) telephone line, comprising:
   connection means for connecting to the telephone line;
   relay means including a talk battery source connected to said connection means for selectively sourcing talk battery voltage and for selectively producing a reverse battery wink;
   line seizure detection means connected to said connection means for detecting when a line seizure occurs on the telephone line;
   dialing receiver means connected to said connection means for receiving dialing code digits and for producing therefrom binary digits corresponding to said dialing code digits; and
   control means, having a memory and an indicator, connected to said relay means, said line seizure detection means and said dialing receiver means for measuring and timing the telephone line wink protocol, for measuring and timing the duration of the dialed digits, for producing therefrom measured values, for comparing said measured values to standard values stored in said memory, for producing comparison values therefrom, and for indicating said values on said indicator.

2. The instrument according to claim 1 wherein said dialing receiver means is further operable for receiving at least one of DTMF dialing code digits, dial pulse dialing code digits, and MF dialing code digits and for producing binary digits corresponding to said dialing code digits.

3. A hand-held signal and test instrument for testing a DOD trunk telephone line, comprising:
   connection means for connecting to the telephone line;
   relay means including a line termination impedance connected to said connection means for selectively terminating the telephone line with said termination impedance;
   wink detection means connected to said connection means for detecting when a reverse battery wink occurs on the telephone line;
   dialing transmitter means connected to said connection means for transmitting dialing code digits in response to binary digits corresponding to said dialing code digits; and
   control means, having a memory and an indicator connected to said relay means, said wink detection means and said dialing transmitter means for measuring the telephone line wink protocol, for measuring the timing and response to the transmitted dialing code digits, for producing therefrom measured values, for comparing said measured values to standard values stored in said memory, for producing comparison values therefrom, and for indicating said values on said indicator.

4. The instrument according to claim 3 wherein said dialing transmitter means is further operable for transmitting at least one of DTMF dialing code digits, dial pulse dialing code digits, MF dialing code digits and CALL PROGRESS tones.

5. A hand-held signaling test apparatus for testing a DID, DOD or POTS trunk telephone line, comprising:

connection means for connecting to the telephone line;

relay means including a talk battery voltage source connected to said connection means for selectively sourcing talk battery voltage and for selectively producing a reverse battery wink;

said relay means further including a termination impedance connected to said connection means for selectively producing a line termination;

line seizure detection means for detecting line seizure;

wink detection means connected to said connection means for detecting when a reverse battery wink occurs on the telephone line;

dialing receiver means connected to said connection means for receiving first dialing code digits and for producing therefrom first binary digits corresponding to said first dialing code digits;

dialing transmitter means connected to said connection means for transmitting second dialing code digits in response to second binary digits corresponding to said second dialing code digits;

control means including a memory and an indicator connected to said relay means, said line seizure detection means, said wink detection means, said dialing receiver means, and said dialing transmitter means for performing any one of the measurement functions of:

(a) measuring the wink protocol interval;
(b) measuring the dialing code receive rate;
(c) measuring the response to the dialing code transmit rate;
(d) measuring the voltages on the telephone line; and said control means further operable for comparing measured values produced from said measurement functions to standard values stored in said memory, for producing comparison values therefrom and for displaying said values on said indicator.

6. The instrument according to claim 5 wherein said first dialing code digits are one of the group of DTMF, dial pulse or MF digits.

7. The instrument according to claim 5 wherein said second dialing code digits are selected from the group of DTMF tones, dial pulse, MF tones and CALL PROGRESS tones.

8. The instrument according to claim 5 wherein said control means further includes the functions of measuring the tone duration of DTMF tones, measuring the inter-digit duration of DTMF tones, and measuring the twist of the DTMF tones.

9. The instrument according to claim 5 wherein said control means further includes the functions of measuring the tone duration of MF tones, measuring the inter-digit duration of MF tones, and measuring the twist of the MF tones.

10. The instrument according to claim 5 wherein said control means further includes the function of measuring the make-to-break ratio of dial pulse received digits and the inter-digit period of received dial pulses.

* * * * *